United States Patent Office 3,524,682
Patented Aug. 18, 1970

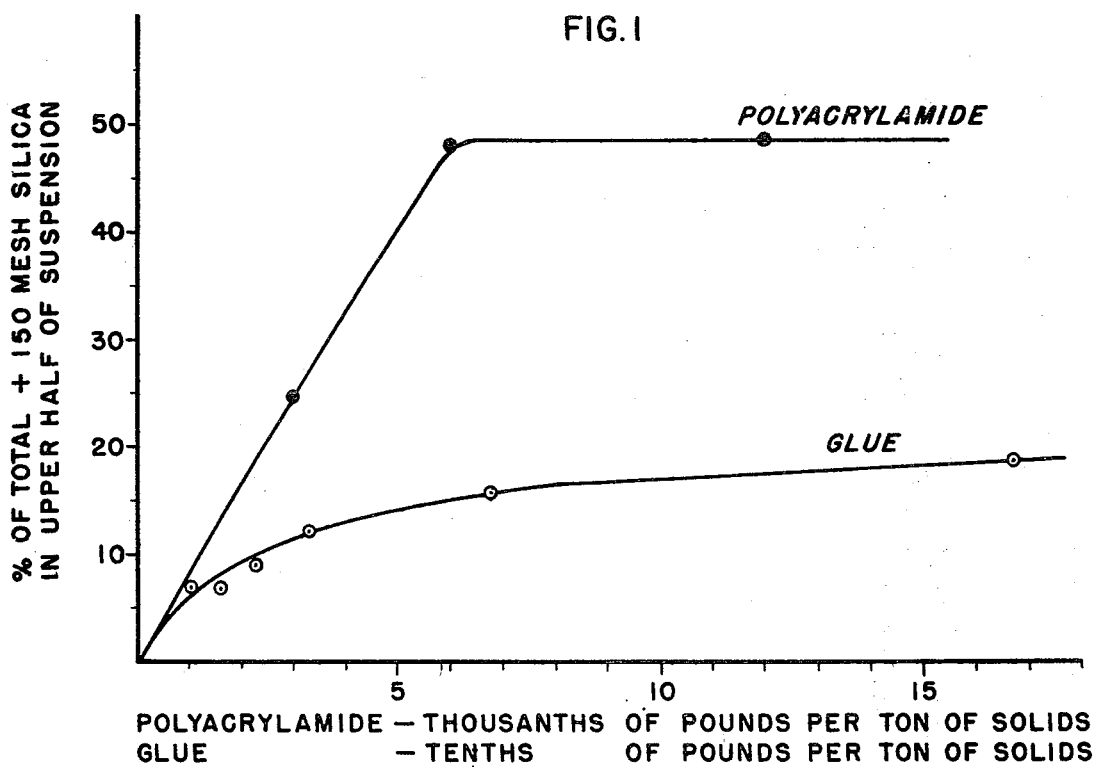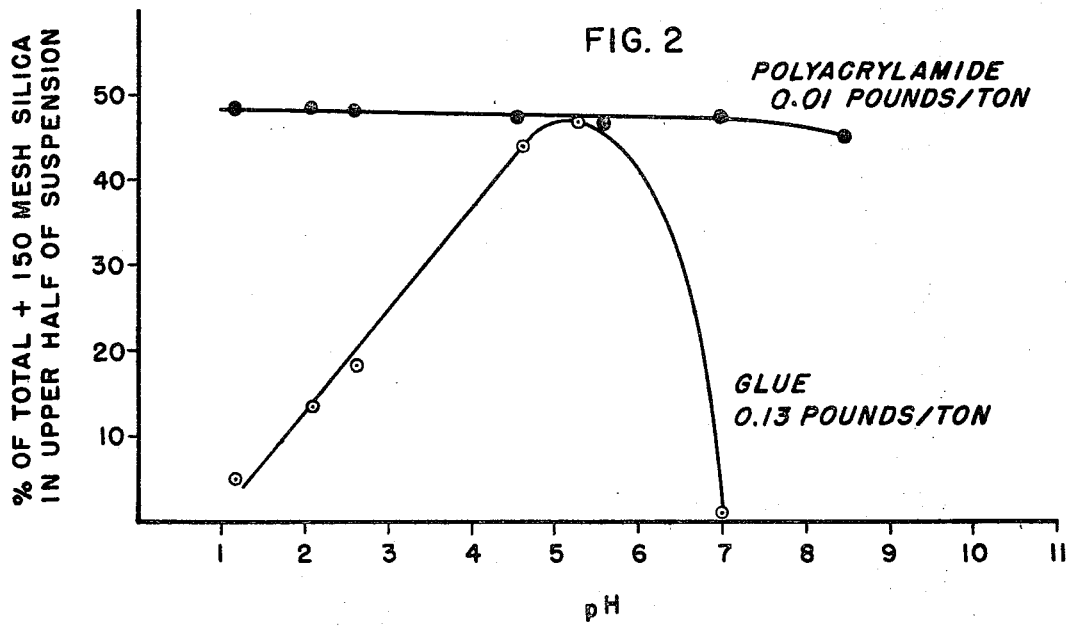

3,524,682
COAL SUSPENSION PUMPING USING
POLYELECTROLYTES
Robert Ben Booth, Stamford, Conn., assignor to American Cyanamid Company, New York, N.Y., a corporation of New York
Continuation-in-part of application Ser. No. 698,429, Nov. 25, 1957. This application Mar. 7, 1962, Ser. No. 179,287
Int. Cl. B65g 53/04
U.S. Cl. 302—66    2 Claims This is a continuation-in-part of application Ser. No. 698,429, filed Nov. 25, 1957, entitled "Fluidizing Aqueous Suspensions of Solids," which application is abandoned in favor of the present application.

The use of polyacrylamide for flocculation purposes was disclosed and claimed in applications of Robert Ben Booth and John M. Dobson, Ser. Nos. 296,082, filed June 27, 1952, and 386,678, filed Oct. 16, 1953, both now abandoned in favor of Ser. No. 399,836, filed Dec. 22, 1953, now U.S. Pat. No. 3,418,237, Dec. 24, 1968.

This invention relates to the fluidizing of finely-divided solids such as ore and mineral suspensions, particularly those containing a broad range of particle sizes, during leaching, particularly acid leaching, and related operations, particularly the acid leaching of uranium ores, by the use of a water-soluble polyelectrolyte. The term "ore" refers to any solid mineral crude which can be profitably processed. Also included are the fluidizing of coal during transmission through pipelines, and maintaining the fluidity of suspensions of sand, or silt, or dredged materials, and maintaining solids in resuspendable form, as in automobile radiators, heat exchangers, settling tanks, thickeners or other process equipment which could be adversely affected by fine solid materials settling out and caking to interfere with subsequent circulation or heat transfer. At times preexisting deposits are loosened and resuspended along with the solids maintained in fluidized state. Such deposits are particularly predominant in sewage lines, including sanitary, storm and industrial lines. Water-soluble linear polyalkanes having polycarboxy substituents, and conveniently, but not necessarily polycarbamyl and polynitrilo groups are effective in the fluidizing. Preferably about 90% or more of the substituents are carbamyl groups.

In such operations as uranium ore leaching, the ore is ground, suspended in water with an acid, and agitated as a suspension for a sufficient length of time to dissolve the recoverable uranium, and then the solids are separated from the acid solution containing the uranium. The leaching is conducted in tanks, and the minerals are maintained in suspension by agitation. Portions of the suspended minerals tend to drop out by gravity, and clog up the agitators, pipes, pumps, and other leaching equipment.

Frequently, the aqueous suspension, through accident or design, must remain in a quiescent state for various periods of time. When permitted to remain in a quiescent state, there is a marked tendency for the coarser particles to drop out more rapidly than the finer particles with a result that there is a layer formed at the bottom of the particular vessel consisting mainly of the coarser particles, and above that is a layer which may or may not tend to drop out, containing the more finely divided materials. In other words, a form of classification occurs. In this classification there is also a tendency for the heavy coarser particles to solidify or pack or cake. Sometimes this does no particular damage, as for example, if the materials are suspended in a conical bottom tank in which air or liquid can be introduced at the bottom and thus stir up and disturb the solid materials. Sometimes even such tanks become clogged. Frequently, however, it is found that the dropping out of the solid particles causes difficulties. For example, in a leaching tank the solid particles may pack around an agitator with such firmness that it is necessary for the larger solid particles to be removed with water or air jets or even picks and shovels to permit the agitator to again start operating. Due to power outages or other accidental causes, it is not unusual for a tank to lose its agitation, and when power is again ready to be applied, it is found the agitators are so firmly frozen in position that the agitator motors burn out, or blow fuses or circuit breakers. Sometimes agitator blades or shafts are snapped.

In many instances this problem has been to some extent overcome by attempting to design equipment which minimizes the problem. As above mentioned, conical bottom tanks in which air streams can be introduced at the bottom are not so subject to clogging and, if clogged, can sometimes be placed back in operation by air action alone. In many instances it is admittedly desirable to be able to use flat bottom tanks or smaller pipes for treatment of the suspensions, but because of known difficulties, the system had to be designed to meet current operating standards, even though such design practice may have markedly increased the cost of the plant.

To some extent efforts have been made to overcome this difficulty by introducing agents, such as glue, into the suspended solids. The use of glue is sharply limited by the variation in its effect with pH and the comparatively large quantities required, which raise the cost of operations. Under the highly acid conditions used for uranium ore leaching, glue largely loses its effectiveness as a fluidizing agent. Glue is less effective at a pH range below 4 than at a pH of about 6. Glue has the further disadvantage that at lower pulp densities it is relatively ineffective. For example, in decreasing the pulp density in one Canadian uranium leaching operation from the normal 65% solids to 50%, glue in economic amounts failed to show a fluidizing effect. For some purposes, polymers of acrylic acid have been used with water-swelling clays and bentonites to make thixotropic drilling muds which suspend drill-cuttings when circulation stops. Addition of bentonites to suspensions of ores and minerals in acid leaching operations has not shown the same effect as in drilling oil wells and has failed to eliminate the above-described problems caused by the dropping out of mineral particles. Occasionally, polyacrylamides have been used to suspend uniform dispersions of fine solids, such as pigments. In ore and mineral suspensions, there is a broad range of particles sizes, and the suspension must be of a consistency which can be handled at all times.

It has now been found that by introducing from about 0.005 to 5 pounds per ton of suspended solids of a polyelectrolyte into the aqueous suspension there is a tendency for the finer particles to integrate with larger and give a composition of more uniform characteristics, and hence fluidize the suspension.

The fluidization is particularly useful at comparatively high solid concentrations and in fact makes feasible the use of concentrations of solids which were previously regarded as completely inoperable. In other words by using the present novel fluidizing agents, a higher percentage of solids can be handled in leaching, stirring and agitating operations and the suspensions can be treated in tanks and other equipment and more uniformly and smoothly fed through pipes, valves, bends, turns, sumps, siphons, pipelines, etc. than has been previously possible with known fluidizing agents. The high degree of mobility thus imparted to the ore suspensions definitely facilitates their handling.

The effect which herein is called fluidizing, or anti-caking or anti-packing, is rather difficult to explain theoretically. In certain tests, for instance, it is found that if a suspension of fine and a coarse minerals is agitated, the material remains fluid and fairly easy to handle. If, however, stirring is stopped, the coarser solids rapidly drop out and thus form a stable dense layer. In contradistinction thereto by using the present polyelectrolytes there is formed a fluidized suspension in which the solids drop uniformly, if at all, as a homogeneous fluidized mass so that on moderate agitation the solids are again uniformly suspended.

The use of the polyelectrolyte fluidizing agents is highly beneficial and gives improved results in the leaching of a variety of ores, concentrates, roasted and calcined products, metallurgical slags and mattes and residues, which contain uranium, cobalt, and other rare metals, copper, nickel, zinc, manganese, calcium phosphate, titanium, alumina, bauxite, bauxite clays, kaolins, etc. Such leaching may be conducted at atmospheric pressure in vessels equipped with air and/or in mechanical agitators, or in Pachuca-type tanks equipped with air lifts for circulating the ore pulp, and also under pressure in specially constructed tanks or autoclaves. In such leaching operations temperatures range from room temperature up to 100° C., or higher if pressure vessels are used. Various acids such as sulfuric, sulfurous, nitric, phosphoric, and hydrochloric acids are used in such leaching operations. Also acids may be autogenously generated by simply adding water to dissolve the acid constituents of ores or concentrates and the resulting acidic liquors used for leaching purposes.

The effect of the polyelectrolytes is particularly useful in operations, such as the extraction of uranium from uranium ores in which the ore is leached with an acid, such as sulfuric acid or nitric acid. As the leaching occurs, it is preferred that the system be such that moderate agitation can be employed rather than high speed, violent agitation, to prevent the dropping out of a layer of ore solids. Also, it is highly desirable that the suspension be such that should a power failure occur, the settled solids in the leach tank do not set up so as to require laborious and time-consuming manual clean-outs.

In the processing of ores, and particularly uranium ores, the marked advantages introduced by the present fluidizing may be utilized in any of several ways. The present fluidizing agents allow leaching to be conducted over a wider range of pulp densities than previously used. It is possible to use smaller agitation equipment to keep the solids suspended, or to use less power for agitation; or in the case of some ores, to use a higher solids concentration in the pulp so that more ore can be processed through a given series of leaching vessels; or to use the improved fluidization to permit the utilization of less finely ground ores and save in the cost of grinding of the ore. The advantage of the present fluidization may be utilized in part by taking advantage of any or all of these process improvements.

In addition to the increased flexibility of operations, there is a tremendously important advantage that should any portion of a fluidized system remain unagitated even for considerable periods, the solids remain in a fluidized state so that immediately on resumption of agitation or circulation the materials flow readily.

The polyelectrolyte may be added at any point in processing where it is desired to prevent the heavier particles from settling out, and to maintain a fluidized state. The polyelectrolyte may be used in conjunction with agents, such as glue or gelatin, or may be used alone. All of the fluidizing agent may added initially, or part of the polyelectrolyte may be added initially and additional quantities added after part of the leaching has taken place.

Such staged additions as above are preferred by many operators particularly if the ore suspension is processed for long periods of time. Additional quantities of the same or different polyelectrolyte may be added to assist in a subsequent dewatering operation in which the fluidized solids are separated from the aqueous phase by filtration or decantation.

The polyelectrolyte fluidizing agent may be added as a solution or in dry sub-divided solid form to the suspended solids. Dry additions are preferred in many operations, especially those of long duration wherein the suspension is processed over several hours or several days. In such cases, the feeding of staged additions of the polyelectrolyte as a dry solid is the preferred practice. For example, in continuous leaching of ores in agitators arranged in series, excellent results are obtained by feeding continuously small amounts of the polyelectrolytes in dry solid form to some or all of the agitators in the series. Continuous feeding to batch leaching also gives excellent results. The preferred polyelectrolyte fluidizing agents dissolve so as to be present in concentrations sufficient to impart the desired improved fluidity to the suspension of mineral solids. The polyelectrolyte may also be added as a solution in water or other solvent and as such may be fed in a single stage, in multiple stages or continuously. Solutions of the polyelectrolyte are particularly convenient for small scale operations. Solid feed is more convenient for larger operations.

The polyelectrolytes may be added to the suspensions of solids in water in various fashions. For example, the polymers may be added to the solids before the solids are suspended, or they may be added to the water or solutions in which the materials are to be suspended or may be added to the suspension after it is formed. For convenience in measuring small amounts of the added polyelectrolyte, it is particularly convenient to dissolve the polyelectrolyte in water to form stock solutions of 1–5% concentration, which may be diluted if desired to allow accurate feeding of small quantities.

In feeding dry polyelectrolytes, a vibrating type feeder, or other type feeder may be used to slowly feed the system. A slow flow of solid particles is easily dispersed, and lumping of the polyelectrolyte does not occur. The usual equipment used for feeding liquid reagents in mineral dressing practice may be used for feeding solutions of the polyelectrolytes.

All or a major portion of the polyelectrolyte may be added initially, but, the polyelectrolyte appears to be absorbed on the surface of fines in the mineral suspensions and better results are obtained with a given amount of polyelectrolyte, or the same results with a smaller amount of the polyelectrolyte, if the addition is gradual during the period of agitation in leaching, or other treating of the ore.

Additional quantities of the polyelectrolyte may be added after the leaching is complete to act as a flocculant in separating the ore from the water or aqueous solutions in the suspension.

The polymers which are found to be effective in the fluidizing of aqueous suspensions of solids are water soluble polymers of a compound represented by the formula:

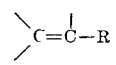

wherein R is selected from the group consisting of nitrile, amide, and carboxyl radicals, COOM where M is a lower alkyl radical preferably of 1 to 4 carbon atoms, and the water soluble salts thereof. Elements such as halogens, particularly chlorine, or alkyl or aryl groups as well as hydrogen may be present on the backbone hydrocarbon chain of the polymer.

Suitable polymers for use in the present invention may be obtained by polymerizing acrylic compounds, such as acrylic acid or derivatives having groups which are hydrolyzable to acid, such as, for example, acrylonitrile, esters of acrylic acid, etc. Chloroacrylamide or methylacrylamide give polymers with substituents on the backbone. Acrylic acid or acrylamide may be polymerized to form homopolymers or may be copolymerized with other compounds of the group or small amounts of other compounds, such as diallyl dimethyl ammonium chloride, vinyl pyridine, vinyl acetate, styrene, vinyl ethers, vinyl halides, or unsaturated hydrocarbons such as isobutylene. Particularly useful are polyacrylic acid, polyacrylamide, hydrolyzed polyacrylonitrile, including acid-hydrolyzed polyacrylonitrile, and alkali-hydrolyzed polyacrylamide, and acrylic acid-acrylamide copolymers. Water-soluble cross-linked polyacrylamides are also useful and methylenebisacrylamide in small quantities is a highly useful cross linking agent. These polymers of low, medium, and high voscosities, or molecular weight range are satisfactory. Molecular weights as low as 100,000 are useful. Molecular weights of well over 3 million are preferred. As long as the polymers are sufficiently low in molecular weight as to be water soluble, they have the characteristics required. Polymers of molecular weights of at least 20 million have such attributes.

The upper limit is very ambiguous as different methods of measuring molecular weight give materially different values, since different measurements by supposedly reliable methods give variations of 2,000,000 to 5,000,000 in the molecular weight of a singly polymer. Viscosity measurements, particularly intrinsic viscosity determinations, are a convenient method of characterizing polymers, as described by M. L. Huggin in "Industrial and Engineering Chemistry," volume 35, pages 980–986 (1943). Viscosity determinations may be conducted by well known methods such as by an Ostwald viscosimeter at polymer concentrations of 0.05–0.5% at 30° C.

Polyacrylamide, polyacrylic acid and hydrolyzed polyacrylonitrile have the general formula:

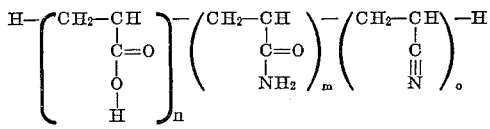

where $n$, $m$ and $o$ are whole numbers, and the groups within the parentheses occur in random order and orientation, $n$ is at least 3, and $o$ may be zero, and $m$ may be zero, but preferably $m$ is greater than $n$. The groups can be referred to as carbamylethylene, carboxyethylene and nitriloethylene, respectively. The carboxy group, of course, can exist as its salt, and as an alkali salt such as sodium or in solution in ionized form, and such forms are the natural and inherent equivalent of the carboxy form itself in the present suspension system, as enough cations of various salts are present in the solids and water to react with free carboxyl groups, to form salts. The free acid with polyacrylamide, or the sodium salt of hydrolyzed polyacrylonitrile are frequently preferred commercially.

The nitriloethylene group is not inherently required and is normally only present in small proportions representing an unhydrolyzed fraction from the polymerization of materials containing acrylonitrile. At least some carboxyethylene linkages are present in all commercial products. In polymerization of acrylamide, at least a small fraction is hydrolyzed, and at least three carboxy groups are present per molecule, even though with molecular weight of over a million, the actual percentage can be very small.

By historical custom, many of the present polyelectrolytes are referred to and named as polymers of the more conventional starting materials, such as polyacrylamide or polyacrylic acid, although the same compound can be formed by the hydrolysis of polyacrylonitrile, hydrolysis of polyacrylamide or copolymerization of acrylamide-acrylic acid. Thus, a hydrolyzed polyacrylonitrile is actually essentially a polycarbamylethylene polycarboxyethylene polyelectrolyte.

A minor proportion of linkages from the other vinyl compounds above referred to may be present.

The polyacrylamides are particularly effective in acid leaching, such as used with uranium ores. The polyacrylamides retain their efficiency even at a pH below 1. Polyacrylic acid and hydrolyzed polyacrylonitriles are also particularly useful for alkaline circuits containing alkaline earth minerals.

The present effect is particularly useful where there is a wide range of particle size present. For instance, while a polyelectrolyte is useful as a fluidizing agent if added to a suspension of uniformly sized coarse materials, it is much more effective if fines are also present.

The exact size range over which the present effect occurs is very wide indeed. It is particularly useful when some of the suspended materials are comparatively coarse—that is, are retained on a 65 mesh per inch screen and others are comparatively fine, that is, readily pass a 325 mesh to the inch screen.

More coarsely ground ores may be leached in the presence of the present fluidizing polyelectrolyte, as such coarse material does not then clog up the agitators. The use of the fluidizing polyelectrolyte permits concurrent treatment of the sands and slimes instead of using separate leaching circuits, as it permits the leaching of a more coarsely ground ore under a particular set of conditions. With ores or minerals in which the specific gravity is higher, a finer state of division is normally required for a full fluidizing effect. It is to be noted that even if complete fluidization does not occur, none the less a partial fluidization is extremely useful in maintaining circulation.

FIG. 1 shows the suspending effect of polyacrylamide versus glue as a function of concentration.

FIG. 2 shows the suspending effect of polyacrylamide versus glue as a function of pH.

Whereas the exact scope of the present invention is set out in the appended claims, the following specific examples illustrate certain aspects of the present invention, and more particularly point out methods of evaluation or testing to show the unique advantages of fluidization with polyelectrolytes.

EXAMPLE 1

A uniform suspension of ground silica in water, about 620 ml. in volume and 60% solids (weight/weight) in pulp density, is prepared by the addition of 300 grams of plus 150 mesh silica and 300 grams of minus 200 mesh silica to 400 grams water which contains sufficient sulfuric acid to give a pH of 1.0 to the final suspension. The plus 150 mesh fraction contains about 48% of plus 65 mesh material and about 3% plus 48 mesh material. The mixture is agitated with a plunger for about 30 seconds, thus forming a uniform suspension. The suspension is allowed to stand for two minutes during which time the coarse fractions of the suspended silica are observed to drop out rapidly. Then the upper half of the suspension, is drawn off and filtered. The filter cake is dried and screen analyzed to determine the content of plus 150 mesh silica.

A series of tests as above were run in which the silica suspensions were allowed to stand for the two-minute period after treatment with various amounts of a polyacrylamide with a molecular weight of approximately 2 million. A second series of tests were run under the same conditions using glue instead of polyacrylamide. The glue or polyacrylamide were dissolved in 100 gram portion of the water used to suspend the silica.

The amounts of plus 150 mesh silica contained in the upper half of the suspension at the end of two-minute settling period at a pH of 1.0 were found to be as follows:

| Test | Pounds per ton of polyacrylamide | Glue | +150-mesh silica in upper half Grams | Percent of total |
|---|---|---|---|---|
| 1 | None | None | None | None |
| 2 | 0.003 | None | 74 | 24.7 |
| 3 | 0.006 | None | 144 | 48.0 |
| 4 | 0.012 | None | 146 | 48.7 |
| 5 | None | 0.1 | 20 | 6.7 |
| 6 | None | 0.17 | 20 | 6.7 |
| 7 | None | 0.23 | 27 | 9.0 |
| 8 | None | 0.33 | 37 | 12.3 |
| 9 | None | 0.67 | 47 | 15.7 |
| 10 | None | 1.67 | 56 | 18.7 |

These results are graphically presented in FIG. 1, which clearly demonstrates the superiority of polyacrylamide to glue as a fluidizing agent.

EXAMPLE 2

Uniform suspensions of mixed +150 and −200 mesh silica are prepared as set forth in Example 1 and treated with polyacrylamide and glue at the natural pH of the suspensions, pH 5.6. The amounts of +150 mesh silica in the upper half of the suspension after the two-minute settling period in one particular run at a pH of 5.6 was found to be as follows:

| Test | Pounds per ton of polyacrylamide | Glue | +150-mesh silica in upper half | |
|---|---|---|---|---|
| | | | Grams | Percent of total |
| 1 | None | None | 0 | 0 |
| 2 | 0.003 | None | 71 | 23.7 |
| 3 | 0.006 | None | 140 | 46.7 |
| 4 | 0.009 | None | 142 | 47.3 |
| 5 | 0.012 | None | 142 | 47.3 |
| 6 | None | 0.07 | 79 | 26.3 |
| 7 | None | 0.10 | 131 | 43.7 |
| 8 | None | 0.13 | 141 | 47.0 |
| 9 | None | 0.17 | 140 | 46.7 |

EXAMPLE 3

Uniform suspensions of mixed +150 and −200 mesh silica are prepared as described in Example 1. The natural pH of such suspensions is 5.6. To a series of such suspension sulfuric acid or sodium hydroxide is added so a to vary the pH over the range of 1.2 to 8.5. To each suspension 0.01 pound per ton of polyacrylamide is added. To a second series of suspensions with a similar pH range, 0.13 pound per ton of glue is added. Following the addition of polyacrylamide or glue in solution as described in Example 1, each suspension is agitated and then allowed to stand for two minutes. The upper half of the suspension is drawn off and filtered, and the filter cake dried and screen analyzed to determine the content of +150-mesh silica.

For one particular typical run the amounts of +150-mesh silica contained in the upper half of the suspension were as set forth in the following table.

| | 0.01 lb./ton polyacrylamide +150-mesh silica in upper half | | 0.13 lb./ton glue +150-mesh silica in upper half | |
|---|---|---|---|---|
| pH | Grams | Percent of total | Grams | Percent of total |
| 1.2 | 145 | 48.3 | 15 | 5.0 |
| 2.1 | 146 | 48.7 | 41 | 13.7 |
| 2.6 | 143 | 47.7 | 50 | 16.7 |
| 4.6 | 142 | 47.3 | 133 | 44.3 |
| 5.6 | 140 | 46.7 | 141 | 47.0 |
| 7.0 | 143 | 47.7 | 4 | 1.3 |
| 8.5 | 137 | 45.7 | None | 0 |

The above data is shown in FIG. 2. The particularly wide range of pH values over which the polyacrylamide is effective is clearly shown by this example.

EXAMPLE 4

A sample of Canadian uranium ore is ground to about −48 mesh with 59% −200 mesh in particle size, and leached at 60% solids with 60 grams per liter of sulfuric acid in aqueous solution. Samples of the leached pulp containing 600 grams of ore are treated with polyacrylamide in a series of tests and allowed to stand for fifteen minutes after which time the upper 300 cc. of the suspension is siphoned off and filtered. The filter cake is dried and screen analyzed to determine the content of +200 mesh ore solids. A second series of samples of the leached pulp are treated simultaneously with glue, and screen analyzed as above. The polyacrylamide and glue are added in aqueous solution.

The results of one series of tests are shown in the following table.

| Test | Pounds per ton of polyacrylamide | Glue | +200 mesh solids, percent of total |
|---|---|---|---|
| 1 | None | None | 4.1 |
| 2 | [1] 0.003 | | 27.8 |
| 3 | [1] 0.006 | | 26.4 |
| 4 | [1] 0.009 | | 41.9 |
| 5 | [1] 0.015 | | 40.2 |
| 6 | | [1] 0.13 | 31.5 |
| 7 | | [1] 0.26 | 29.0 |
| 8 | | [1] 0.5 | 30.3 |
| 9 | | [1] 1.0 | 36.1 |

[1] Pounds-ton, solids.

EXAMPLE 5

Samples of 1200 grams of the uranium ore described in Example 4 were leached with 60 grams sulfuric acid per liter at a pulp density of 60% solids in 1500 cc. beakers for 6 hours at 45° C. During this time the pulp was agitated with an electrically-driven, cruciform impeller operating at 250 r.p.m.

At the end of this 6-hour period the stirrer was removed and immediately in the pulp on the bottom of the beaker was placed a flat, stainless steel circular disc, 3/64 inch thick and 1.5 inches in diameter, to which at the center a stainless steel rod, 1/8 inch in diameter and 8 inches in length was attached. This rod was equipped with a hook at its upper end so that it could be attached to a 2000-gram spring balance and thus the pull required to start the disc upward through the pulp could be measured. The pull is measured after the pulp is permitted to stand for a specified period of time. This testing method is similar to methods which have found acceptance in the industry to distinguish pulps which cause trouble and is highly useful in determining the degree of compaction that ore or mineral suspensions exhibit on standing.

A series of tests were run by this procedure in which the agitation time was varied from 6–24 hours and the standing time from 16–54 hours. Polyacrylamide or glue in dry solid sub-divided form were added at the start of these tests and the results obtained were compared with those of control tests on leached ore pulp without such fluidizing additives. The results of these tests are summarized in the following table.

| Run | Material added | Hours | | Balance reading, grams |
|---|---|---|---|---|
| | | Agitation | Standing | |
| 1 | None | 6 | 16 | 1,600 |
| 2 | 0.1 lb./ton polyacrylamide | 6 | 16 | 800 |
| 3 | do | 6 | 54 | 1,000 |
| 4 | 0.7 lb./ton glue | 6 | 16 | 1,200 |
| 5 | None | 24 | 24 | (¹) |
| 6 | 0.1 lb./ton polyacrylamide | 24 | 24 | 1,200 |
| 7 | 0.7 lb./ton glue | 24 | 24 | (²) |

¹ Balance pulled off scale and lifted beaker and contents off table.
² Balance pulled off scale.

The above tests simulate conditions which occur in the processing of ore pulps in various operations during plant shut downs, power-outs, etc. and the above results clearly demonstrate the effectiveness of small amounts of polyacrylamide in overcoming the compacting of ore suspensions on long periods of standing.

EXAMPLE 6

A 100,000-ton lot of uranium ore was processed continuously at the rate of 3000 tons per day as follows: the ore was ground to minus 48 mesh and leached to extract uranium at 65–68% solids in water with 60 grams sulfuric acid per liter in the presence of 4.0 lb./ton sodium chlorate. Leaching temperature was 45° C. The ore fed to the leaching operation was split so as to pass continuously into two series of six similar size and type tanks equipped with agitators so that each series treated 1500 tons per 24 hours. The capacity of the tanks in each series was such that the total leaching cycle was 48 hours. Each tank held 250 tons of ore and a total of 3000 tons was agitated at one time. Glue was used as a fluidizing agent in one series of six agitators and polyacrylamide was used in the other.

Glue was added in dry granular solid form and glue requirements were 600 lb. to each agitator during start-up operations and an additional 1.2 lb. per ton of ore was fed continuously in equal portions divided among the six agitators. The total glue used for effective fluidization in treating the ore in the first series of agitators was 63,600 pounds.

Polyacrylamide of an intrinsic viscosity of about 5.6 was added in dry, solid flake form. Polyacrylamide used was only 60 lb. per agitator during start-up operations and an additional 0.12 lb. per ton of ore, fed continuously in equal portions divided among six agitators. Thus, the total requirements were 6,360 pounds, which amounts to one-tenth of the quantity of glue used in similar operations in the first series of agitators.

The fluidization with polyacrylamide was more effective than with the glue. A convenient test as used in the industry is to take a liter of the ore suspension, three times a shift, in a graduated cylinder, allow to stand for five minutes, and measure the sands dropping out into the bottom of the graduate. In the above test with polyacrylamide 10 cc. of such sands were noted as compared with 40 to 60 cc. with glue. This shows the polyacrylamide to be more effective for fluidizing purposes than 10 times as much glue.

EXAMPLE 7

A 100,000-ton lot of uranium ore was leached as described in Example 6. In the first series of agitators 6360 lb. of polyacrylamide of about 2 million molecular weight was added as a fluidizing agent, which was used as also described in Example 6. No clogging or stoppages of agitators during the course of the leaching operations were noted.

In the second series of agitators no fluidizing agent was added. In this case agitator stoppage occurred in some of the leaching tanks before these tanks were completely filled, because of drop-out of coarse solids at the bottom of the tanks. In other tanks the agitators operated for a few hours and then stalled for the same reason. Leaching operations had to be suspended in this section of the plant and the acidic solutions and hard-packed ore were removed by flushing with water and manual digging.

EXAMPLE 8

The same uranium ore and procedure as described in Example 4 are used to test the action of a variety of polymers for keeping the +200-mesh ore particles from dropping out of the suspension. The polymers are used in the amount of 0.015 lb./ton in each test. The results of typical tests are summarized in the following table.

| Polymer used | Intrinsic viscosity | Percent of total plus 200-mesh in upper half |
|---|---|---|
| Polyacrylamide | 6.4 | 43.7 |
| Do | 5.5 | 43.0 |
| Do | 3.1 | 43.5 |
| Do | 2.5 | 41.0 |
| Do | 1.8 | 40.0 |
| 90:10 copolymer of acrylonitrile-acrylamide | 5.4 | 41.0 |
| 89:11 copolymer of acrylamide (AM) diallyldimethyl ammonium chloride (DADM) | 5.7 | 42.0 |
| 80:20 copolymer of AM-DADM | 5.4 | 41.0 |
| 96:4 copolymer of AM-DADM | 5.0 | 41.0 |
| Do | 3.4 | 40.0 |
| Do | 1.8 | 39.0 |
| Do | 1.4 | 39.0 |
| A cross-linked polyacrylamide (0.1% methylene-bisacrylamide) | (¹) | 35.0 |
| Polyacrylamide with 6.2% of the amide groups hydrolyzed to carboxyl groups | 5.7 | 29.0 |

¹ Molecular weight about 2 million.

EXAMPLE 9

A nickel-cobalt ore, assaying 1.2% Ni and 0.14% Co was ground to 50% minus 200 mesh and pressure leached for 2 hours with 22% sulfuric acid at 30% solids. 91.2% of the nickel and 92.0% of the cobalt was extracted in the leaching operation.

Treatment with 0.2 lb./ton of polyacrylamide during the leaching operations allowed the use of a pulp density of 40% solids with other conditions similar to those listed above. The higher pulp density in leaching did not interfere with extraction as 91.3% of the nickel and 92.1% of the cobalt were extracted in this test.

EXAMPLE 10

A manganese ore, assaying about 18.3% Mn, was ground to minus 200 mesh and leached at 20% solids with a 6% water solution of sulfur dioxide for 6 hours at room temperature. The residual ore solids were filtered off, dried, weighed, and assayed for manganese along with the leach liquors. In this operation 87.6% of the total manganese was extracted.

The above procedure was repeated on a second lot of the same manganese ore to which was added 0.15 lb./ton of a 90:10 copolymer of acrylamide-acrylic acid of molecular weight of about 2,000,000 as measured by viscosity methods. In this leach a higher pulp density, 35% solids, was employed. No difficulties in agitation during leaching were noted and an extraction of manganese of 87.7% was obtained, which duplicated the results of the first leach described above in this example.

EXAMPLE 11

A uniform aqueous suspension of fine silica (−200 mesh) with a total volume of 1,000 millimeters in a graduated cylinder is prepared. This suspension is allowed to stand for three days. During this time, the silica settles to a compacted mass which cannot be poured with the supernatant liquid by inclining the graduate and must be flushed out by a stream of high pressure water from a laboratory hose in order to clean out the graduate. The experiment is repeated exactly except that the equivalent of 0.013 pound per ton of a polycarbamylethylene of 3–5 million molecular weight and containing about 1% carboxyethylene linkages is added to the suspension, by agitation with a perforated plunger. After standing three days, the major portions of the solids at the bottom of the graduate were poured out readily along with the water. A similar experiment is run using a long chain polycarbamylethylene of about the same molecular weight range containing 5% carboxyethylene linkages. Again, after three days of standing, the settled solids are pourable along with the supernatant water.

EXAMPLE 12

The experiment described in Example 11 was repeated with a suspension of 150 grams of −150 mesh limestone in one liter of water. After standing for a three-day period, the settled solids remained compacted in the bottom of the graduate while the supernatant water was poured off.

This experiment was repeated using the equivalent of 0.2 pound per ton of a hydrolyzed polyacrylonitrile as the sodium salt. The settled mass at the bottom of the graduate remained fluid after the three-day standing period and was readily poured from the tube with the supernatant water.

EXAMPLE 13

A slit-containing river water used for industrial cooling purposes was treated with 1 part per million of a polyelectrolyte of molecular weight 3–5 million which contained 99% carbamylethylene linkages and 1% carboxyethylene linkages. The treated water was passed into a settling tank and the suspended solids were settled out. The clarified water was used for cooling purposes. After a two-week period, the tank was cleaned out by removing the clear supernatant water and flushing out the settled matter by means of a stream of high pressured water. Treatment with the polyelectrolyte rendered the settled solids soft and mobile and prevented the accumulation of compacted masses on the bottom of the tank. The treatment reduced clean-out time and labor by a factor of about 65%.

EXAMPLE 14

To determine the beneficial effect of polymer treatment in the pumping of fine ore materials, a 1% suspension of phosphate rock slimes was treated with 2 pounds per ton of the polyacrylamide used in Example 13. The suspension was then thickened by gravity to about 16% solids. The solids were thus rendered mobile and amenable to pumping. Compared to a similar sample of untreated slimes, power losses due to friction were reduced by 25% by the treatment of polyacrylamide, and if pumping is interrupted, the low points in the pipe system remain free from clogging.

EXAMPLE 15

The polyacrylamide used in Exmaple 13 was added in quantities in about 10 parts per million to the circulating water in an automobile radiator. The motor of the automobile was operated for a period of 10 minutes in order to thoroughly distribute the polyacrylamide throughout the entire volume of water in the radiator. The radiator was then drained by gravity. The suspended sludge and rust solids were kept fluid and mobile and were readily drained out of the radiator by merely opening the drainage vent at the bottom of the radiator. This result was in marked contrast with the usual radiator cleaning procedure which required several flushings with water to remove incompletely the accumulation of rust and sludge.

EXAMPLE 16

A 5% suspension of fine coal ranging in size from colloidal dimensions to about 14 mesh was similarly treated with 0.5 pound per ton of the polyacrylamide used in Example 12. This suspension was thickened to 60% solids and despite the increase in solids density remained in a fluidized condition and was readily pumpable. Power requirements to move the thickened slurry was 25% lower than observed for a slurry to which no acrylamide had been added. Pumping operations on the polymer treated coal were stopped several times for periods ranging from 1 to 10 hours. Pumping operations were then resumed without clogging of pumps or pipelines. The treatment of coal slurries with polymers thus facilitates the pipeline transportation of coal. The polyelectrolyte causes laminar flow conditions to prevail at a higher velocity than in the absence of the polyelectrolyte. Pumping power requirements increase sharply with the transition from laminar to turbulent flow.

I claim:
1. The method of improving the pumpability of coal suspensions in water which comprises adding to a finely-divided coal-water system, used for the transportation of coal from 0.005 to 5 pounds per ton of suspended solids of a water soluble polyelectrolyte which is a linear carbon chain polymer consisting essentially of recurring carbamylethylene linkages, carboxyethylene linkages and not more than a minor amount of nitriloethylene linkages, and salts thereof, having a weight average molecular weight in excess of 100,000, and pumping the suspension through a pipe line, said polymer increasing the viscosity of the aqueous phase, insuring laminar flow at higher velocities, thereby reducing pumping power requirements, and simultaneously stabilizing the suspension, so that during interruptions in pumping, the coal remains fluidized, and in pumpable condition.

2. The method of improving pumpability and resuspending coal suspensions in water which comprises adding to a coal-water system in which the solids consists essentially of readily water suspendable coal particles, at least some of which are comparatively coarse, that is will not pass through a 65 mesh screen, and some of which are comparatively fine, that is will pass through a 325 mesh screen, which system is used for the transportation of coal, from 0.005 to 5 pounds per ton of suspended coal of a water-soluble polyelectrolyte which is a linear carbon chain polymer consisting essentially of recurring carbamylethylene linkages, carboxyethylene linkages and not more than a minor amount of nitriloethylene linkages, and salts thereof, having a weight average molecular weight in excess of 100,000, and pumping the suspension through a pipe line, said polymer increasing the viscosity of the aqueous phase, insuring laminar flow at high velocities, thereby reducing pumping power requirements, and simultaneously stabilizing the suspension, and at least occasionally interrupting such pumping so that during such interruptions in pumping, the coal remains fluidized, and in pumpable condition.

References Cited

UNITED STATES PATENTS

| | | | |
|---|---|---|---|
| 2,394,083 | 2/1946 | Lintz | 210—54 |
| 2,729,557 | 1/1956 | Booth et al. | 210—58 |
| 2,738,253 | 3/1956 | Thunaes et al. | |
| 3,080,264 | 3/1963 | Zimmie et al. | 134—22 |
| 3,085,916 | 4/1963 | Zimmie et al. | 210—58 |

FOREIGN PATENTS

| | | |
|---|---|---|
| 200,883 | 2/1956 | Australia. |
| 200,682 | 1/1956 | Australia. |

CARL D. QUARFORTH, Primary Examiner

M. J. McGREAL, Assistant Examiner

U.S. Cl. X.R.
252—318; 241—15